United States Patent [19]
Nienhaus

[11] Patent Number: 5,733,196
[45] Date of Patent: Mar. 31, 1998

[54] COUPLING FOR TORQUE LIMITING PURPOSES

[75] Inventor: Clemens Nienhaus, Neunkirchen-Seelscheid, Germany

[73] Assignee: GKN Walterscheid GmbH, Lohmar, Germany

[21] Appl. No.: 730,002

[22] Filed: Oct. 11, 1996

[30] Foreign Application Priority Data

Oct. 14, 1995 [DE] Germany ............ 195 38 351.6

[51] Int. Cl.$^6$ ............................................. F16D 3/10
[52] U.S. Cl. ............................................. 464/1; 192/104 B
[58] Field of Search ............ 192/56.51, 104 B; 464/1, 30

[56] References Cited

U.S. PATENT DOCUMENTS

| | | | |
|---|---|---|---|
| 3,702,649 | 11/1972 | Giese et al. | 192/104 B |
| 4,744,447 | 5/1988 | Kato et al. | 464/30 |
| 5,181,486 | 1/1993 | Gyurovits | 464/1 X |
| 5,273,147 | 12/1993 | Beigang et al | 192/104 B |
| 5,310,382 | 5/1994 | Guimbretiere | 464/1 |
| 5,333,711 | 8/1994 | Beigang | 192/104 B |

FOREIGN PATENT DOCUMENTS

| | | |
|---|---|---|
| 2 429 929 | 1/1980 | France . |
| 1 000 646 | 1/1957 | Germany . |
| 1216622 | 5/1966 | Germany . |
| 30 01 566 | 7/1981 | Germany . |
| 4-312218 | 11/1992 | Japan ............ 192/104 B |
| 849516 | 9/1960 | United Kingdom . |
| 900849 | 7/1962 | United Kingdom . |

*Primary Examiner*—Eileen A. Dunn
*Attorney, Agent, or Firm*—Harness, Dickey & Pierce, P.L.C.

[57] ABSTRACT

A torque limiting coupling (5) for a driveline driving agricultural implements has driving members (16) which, with reference to the rotational axis (15), are displaced inwardly from a torque transmitting position into a disconnected position. If overloading occurs, the driving members (16) are automatically moved to re-engage a groove (45) in the coupling sleeve (42) if the positions of the driving members (16) and the torque transmitting faces correspond to one another. Also, a switching ring (22) loads the driving members (16) with centrifugal segments (36') which, in the case of overloading, are released by the switching ring (22), thus preventing the latter and in consequence the driving members (16) from assuming the torque transmitting position as long as a predetermined limit speed is still exceeded. This measure ensures that the wear at the driving members and torque transmitting faces of the coupling sleeve is reduced.

14 Claims, 6 Drawing Sheets

COUPLING FOR TORQUE LIMITING PURPOSES

BACKGROUND OF THE INVENTION

The invention relates to a torque limiting coupling. Particularly, the coupling is used in drivelines for driving agricultural implements or machinery. The coupling includes a coupling hub and a coupling sleeve relatively rotatably supported thereon by a bearing bore. Driving members are in recesses of the coupling hub and, with reference to the rotational axis, are radially adjustable between a torque transmitting position and a disconnected position. The driving members include switching faces at their two radially inner ends in the direction of the rotational axis and a torque transmitting face at their radially outer heads. The torque transmitting faces act on torque transmitting faces of recesses in the bearing bore of the coupling sleeve in the torque transmitting position. Switching rings are arranged on each side of the driving members in the direction of the rotational axis. Each switching ring includes a supporting face which provides support on the switching faces of the driving members. Also, the switching rings, in a spring-loaded way, in the direction of the rotational axis, push the driving members into the radially outwardly displaced torque transmitting position. Also, against the force of the spring, the switching rings enable the driving members to be moved into the radially inner disconnected position if a predetermined torque is exceeded.

A coupling is described in GB-PS 849 516. Here, the driving members are in the form of radially movable cams received in radial apertures of the coupling hub. The inner end of a driving member has switching faces. The switching faces, by means of corresponding supporting faces of two switching rings positioned on a pin, are pushed radially outwardly with reference to the rotational axis into a torque transmitting position. Each switching ring is associated with a pressure spring. The pressure springs, like the switching rings, are positioned on a tensioning pin which penetrates the springs and is jointly arranged in the bore of the coupling hub.

In a case of overloading, when the set torque is exceeded, the driving members slide into their radially inner disconnected position. The driving members are supported in the bearing bore until, in the course of further rotation, they again come to rest against torque transmitting faces formed by rollers. This reoccurs during every single rotation and does not only lead to impacts but also to wear at the driving members and the respective torque transmitting faces.

SUMMARY OF THE INVENTION

It is an object of the invention to provide a torque limiting coupling where re-connection of the coupling, full contact between the torque transmitting faces of the driving members and those of the coupling sleeve, only takes place if a certain speed is not reached.

In accordance with the invention, at least one of the two switching rings is associated with at least one centrifugal weight. The weight, with reference to the rotational axis, is radially adjustable between a radially outer disconnected position and a radially inner torque transmitting position. The centrifugal weight is held by the switching ring in the torque transmitting position to prevent the weight from being moved and released by the switching ring to move into the disconnected position if the predetermined torque is exceeded. The centrifugal weight holds the switching ring to prevent the ring from returning into the torque transmitting position as long as a predetermined speed is exceeded.

2

An advantage of this design is that if the coupling is transferred into the disconnected position after a set torque has been exceeded, the coupling cannot be re-connected until a correspondingly low speed occurs which is lower than the predetermined limit speed at which the centrifugal weights are returned inwardly into the torque transmitting position.

As a result of the centrifugal weight, the switching ring is held in the disconnected position until the speed drops below the limit speed. The centrifugal weight is then returned into its inner position. This position corresponds to the torque transmitting position and in this position the weight approaches the rotational axis. The centrifugal weight releases the switching ring which then loads the driving members. This enables the driving members to re-assume their torque transmitting position, their radially outwardly displaced position.

According to a preferred embodiment, the recesses for receiving the driving members are provided in the form of slots in the coupling hub. The slots extend radially and parallel relative to the rotational axis. The strip-shaped driving members are adjustable radially and parallel to the rotational axis in the slots.

As a result, it is possible for only one of the two switching rings to be arranged so as to be axially movable. In a further embodiment of the invention, one switching ring is non-adjustably supported on the coupling hub in the direction of the rotational axis. The further switching ring is adjustable and loaded by a spring supported on the coupling hub in the direction of the rotational axis towards the torque transmitting position. To limit the movement of the switching ring, the switching ring, in the torque transmitting position, is held in contact with a stop of the coupling hub. To avoid any jamming, both switching rings, in a radial plane relative to the rotational axis, are guided at the coupling hub so as to be adjustable to a limited extent relative to the rotational axis.

In a particularly advantageous embodiment, the driving members, each on both sides, include first and second switching faces. The first switching faces provide support in the torque transmitting position. The second switching faces have a holding function in the disconnected position. Accordingly, the switching rings each include first and second supporting faces. In the torque transmitting position, the first supporting faces rest against the first switching faces. In the disconnected position, the second supporting faces of the switching rings rest against the second switching faces of the driving members. The switching faces and supporting faces extend such that, as a result of the spring loading the first switching ring, suitable support is provided in the torque transmitting position. The set torque is held in accordance with the transmission ratio. If the set torque is exceeded, the driving members escape radially inwardly, thereby reducing the force radially applied by the spring to the driving member. Re-connection is therefore effected less suddenly, with less force being applied. This also has a positive influence on the wear behavior. Furthermore, the vibration excitation is reduced, and the second switching faces and second supporting faces are arranged such that the first switching ring is held at an axial distance from the centrifugal weight.

If overloading occurs, in consequence, the centrifugal weight is released. Furthermore, axial play is provided even in those cases where the limit speed at which the centrifugal weight is displaced outwardly when the set torque is exceeded, permits an axial space between the switching ring and the centrifugal weight. In consequence, due to the force of the axially acting spring, the driving members may be moved by a small amount radially outwardly in the direction of the torque transmitting position, which, in the present embodiment under the influence of the direction in which the second switching faces and supporting faces extend. However, such a function is also ensured in those cases where second switching faces or supporting faces are not provided. When rotation continues, during further relative rotational movement between the coupling hub and coupling sleeve, the driving members, by means of their torque transmitting faces, can thus partially, but not fully engage the respective torque transmitting face of the coupling sleeve. This results in a certain braking effect which, however, does not lead to substantial loading and wear of the driving members or rather their torque transmitting faces and those of the coupling sleeve.

To advantageously affect such partial engagement and transfer in the outward direction, it is possible to provide a control face in the rotational direction of the coupling hub. In front of the torque transmitting face of the recess of the coupling sleeve relative to the coupling sleeve, the control face is positioned outside the diameter of the bearing bore and thus guides the driving members by a small amount radially outwardly. In consequence, the relative speed is reduced to such an extent that the limit speed at which the centrifugal weight escapes radially outwardly is not reached. The centrifugal weight returns into the starting position to release the switching ring and enable the transfer of the driving members into the torque transmitting position. The rotational angle is larger and thus there is more time available to transfer the driving members than would be the case if the bearing bore extended as far as the region of the recess with an unchanged geometry. To secure the centrifugal weight in the torque transmitting position, the associated switching ring is provided with an annular recess which is engaged by the centrifugal ring by means of a holding lug. The holding lug engages in the direction of the rotational axis and is released after the switching ring has moved away from the centrifugal weight against the force of the spring. The centrifugal weight can only escape radially. Thus, the weight is radially adjustably guided at a radially extending guiding face of the coupling hub. The weight is supported by the conical shape of the annular recess and of the holding lugs which move the centrifugal weights into contact with the guiding face.

To secure, control and especially return the centrifugal weight into the radially inner position corresponding to the torque transmitting position, the centrifugal weight is loaded by a spring. The centrifugal weight preferably has the shape of a ring consisting of a plurality of segments, centrifugal segments.

According to a further embodiment, the centrifugal segments are loaded by a helical tension spring (hose spring) which embraces the centrifugal segments and forms a closed ring. The mass associated with the centrifugal weights and the design of the spring determine the limit speed at which the centrifugal weight or its centrifugal segments are able to escape radially outwardly after the switching ring has escaped axially. The centrifugal segments prevent the switching ring from being axially displaced into the torque transmitting position as long as the speed does not again drop below the predetermined limit speed.

According to a further embodiment, the centrifugal weight is received in a bore of the coupling sleeve. The wall of the bore limits the movement of the centrifugal weight or of the individual centrifugal segments in the disconnected position. To secure the switching ring in the disconnected position, the centrifugal weight and the associated switching ring are provided with holding faces. The holding faces serve to axially support the switching ring against the centrifugal weight. The centrifugal weight, in turn, is supported in the direction of the rotational axis against a guiding face of the coupling hub and can thus escape in only the radial direction, and not axially. The holding faces are preferably arranged such that a certain amount of play exists between them when, in the case of overloading, in the disconnected position, the driving members are supported in the bearing bore by means of their heads. As a result, when the limit speed is not reached, the movement of the centrifugal weight into the starting position, which corresponds to the torque transmitting position of the driving members, is not prevented. However, this also applies to cases of overloading, when the set torque is exceeded.

From the following detailed description taken in conjunction with the accompanying drawings and subjoined claims, other objects and advantages of the present invention will become apparent to those skilled in the art.

BRIEF DESCRIPTION OF THE DRAWINGS

A preferred embodiment of the coupling in accordance with the invention and its application in an agricultural implement is diagrammatically illustrated in the drawings wherein.

DETAILED DESCRIPTION OF THE DRAWINGS

Figure 1:
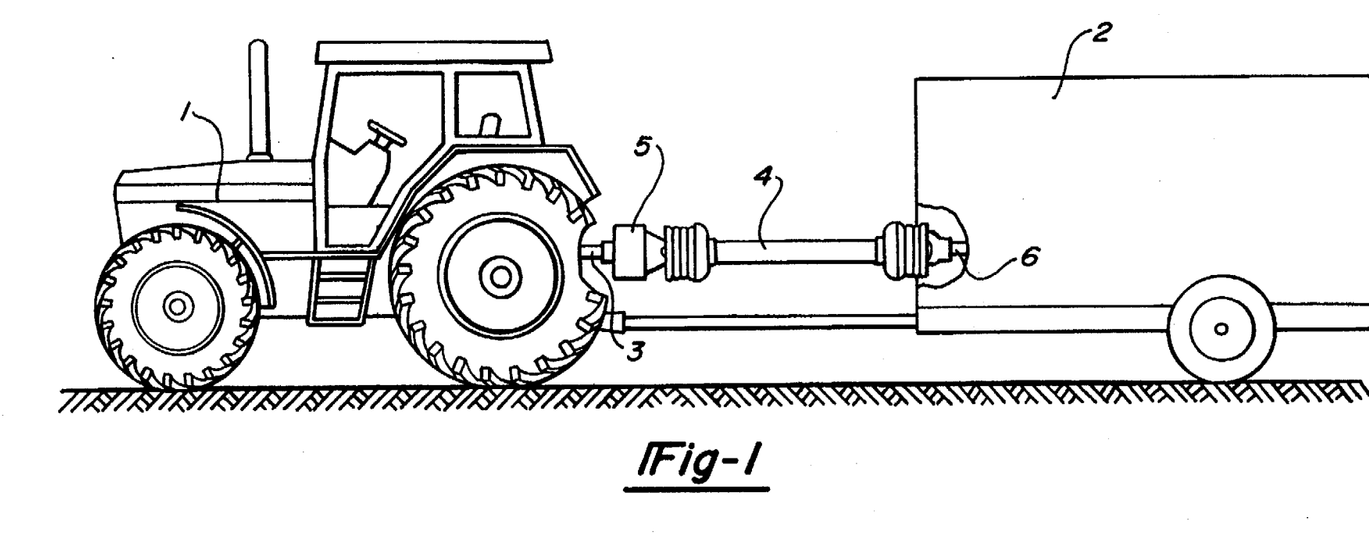
FIG. 1 is a schematic view of a tractor with an attached implement which is driven by a coupling arranged between the tractor and the implement.

FIG. 1 shows a tractor 1 with an attached implement 2. The power take-off shaft 3 of the tractor serves to drive the tools (not shown) of the implement 2 via the propeller shaft 4. The propeller shaft 4 includes the coupling 5 in accordance with the invention which is arranged towards the power take-off shaft 3. Furthermore, the propeller shaft 4, at the implement end, is connected to a driveshaft 6. It is the purpose of the coupling 5 to interrupt the drive in those cases where clogging occurs in the region of the tools of the implement 2. The power take-off shaft 3 continues to rotate, but the transmission of torque to the propeller shaft 4 is interrupted. The design of the coupling 5 and the way in which it functions are explained in greater detail with reference to FIGS. 2 to 7.

Figure 2:
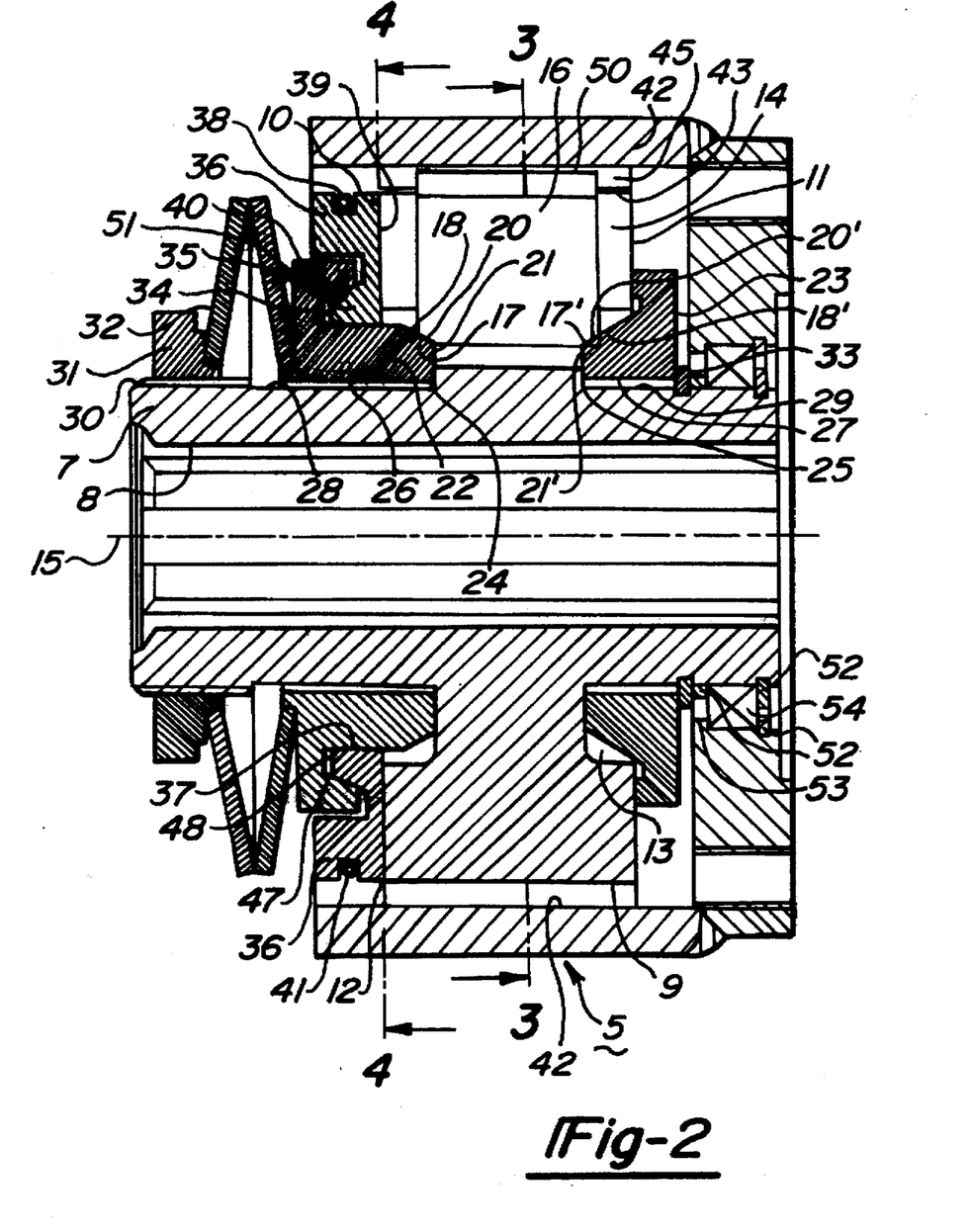
FIG. 2 is a longitudinal section view through a coupling in accordance with the invention in the torque transmitting position.
Figure 3:
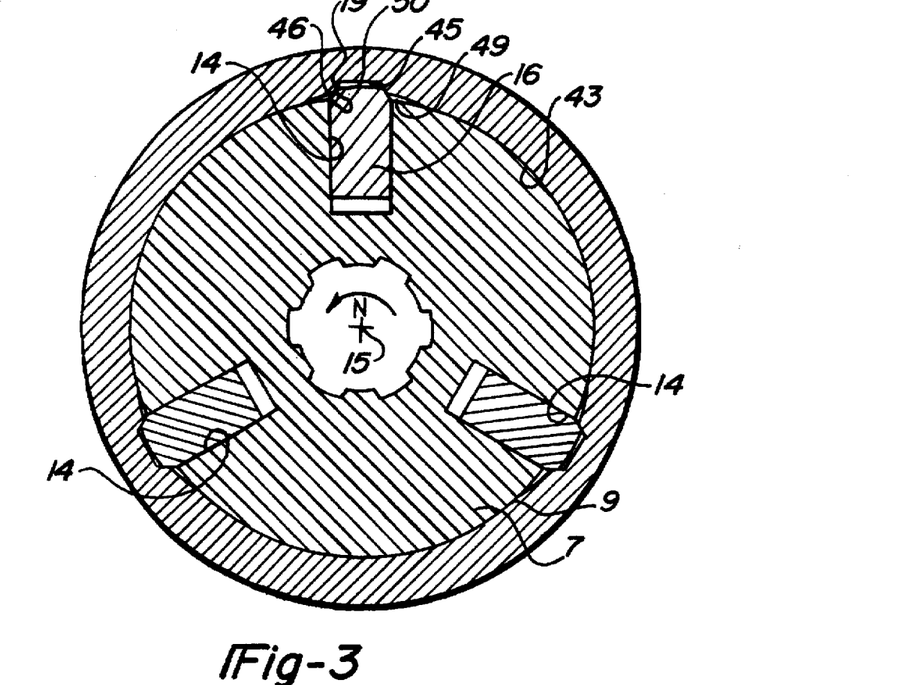
FIG. 3 is a section view according to FIG. 2 through line 3—3 thereof.
Figure 4:
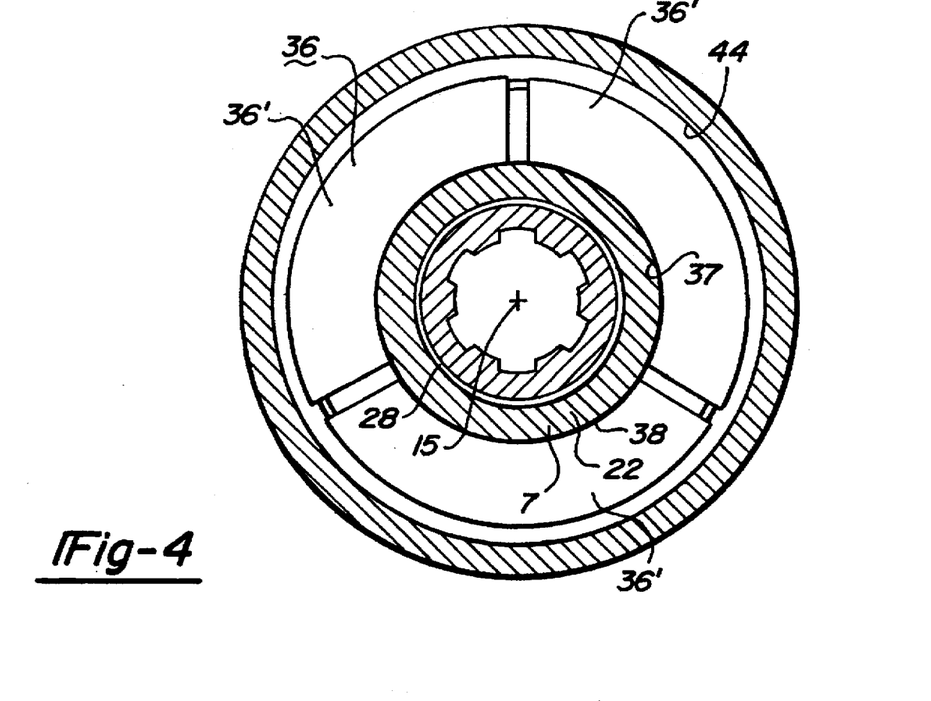
FIG. 4 is a section view according to FIG. 2 through line 4—4 thereof, which shows the position of the centrifugal segments of the centrifugal weight in a position corresponding to the torque transmitting position.
Figure 5:
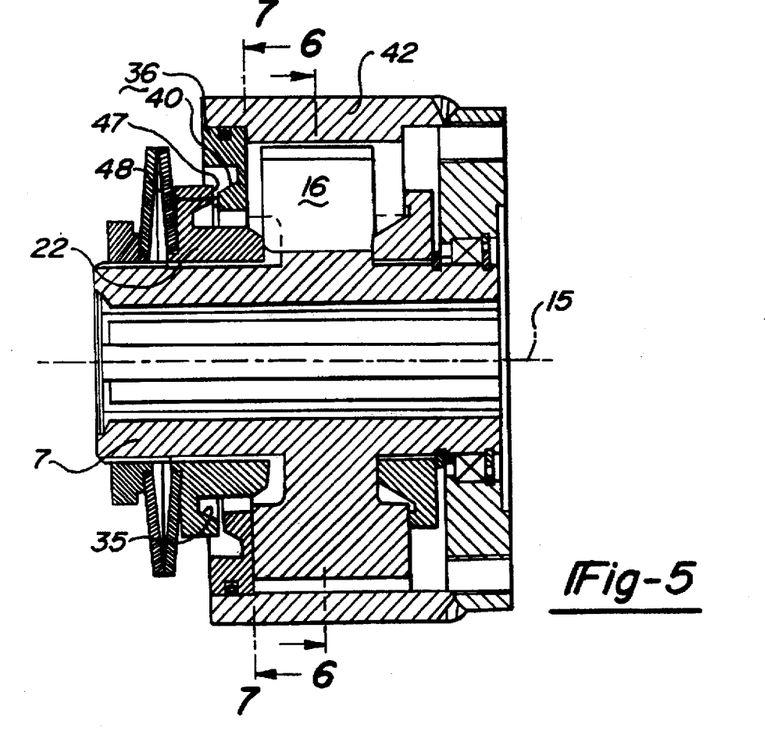
FIGS. 5–7 are views corresponding to FIGS. 2–4, showing a position in which a case overloading has occurred, the driving members and the centrifugal segments as well as the switching ring are in the disconnected position.
Figure 6:
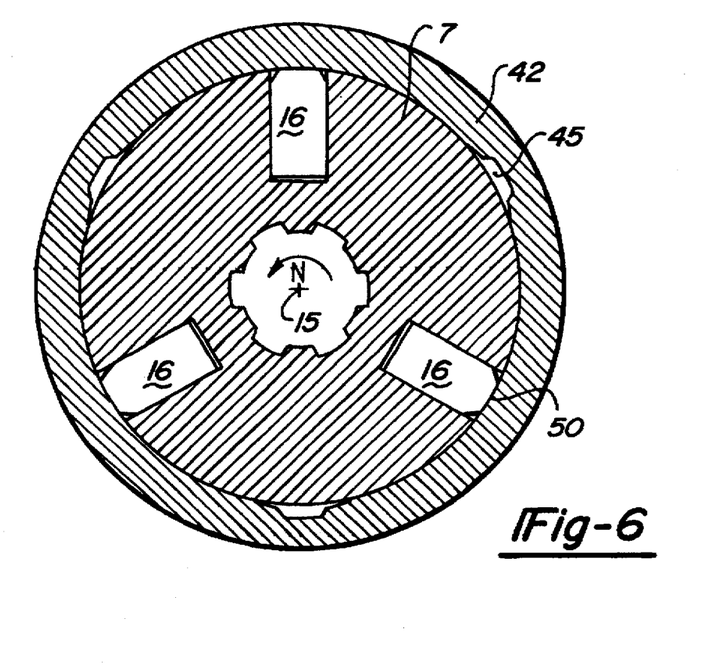
Figure 7:
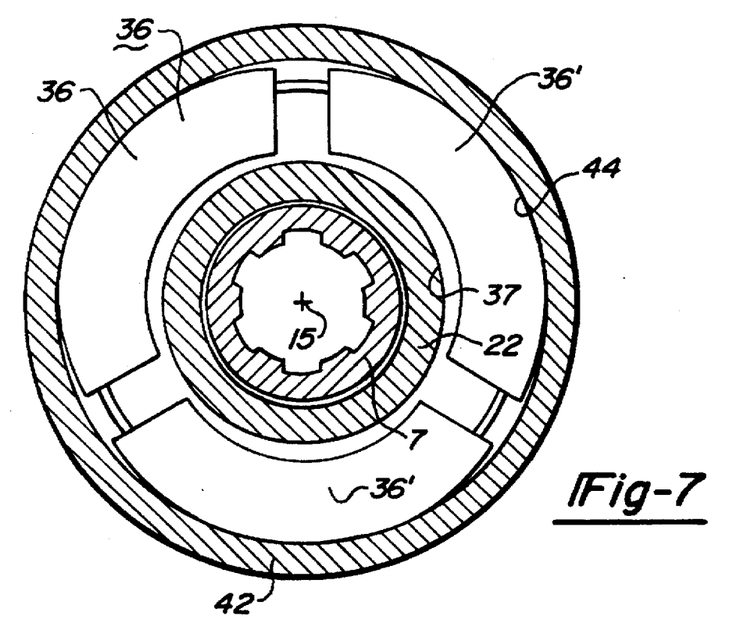

FIGS. 2 to 4 show the coupling 5 in the torque transmitting position. The coupling 5 includes a coupling hub 7 with a plug-on bore 8 which is arranged centrally relative to the rotational axis 15. The bore 8 serves to establish a non-rotating connection between the coupling hub 7 and, for example, the power take-off shaft of the tractor as shown in FIG. 1. The outer face 9 of the coupling hub 7 is cylindrical. The hub 7 is delimited by the two side faces 10, 11 which serve as guiding faces at the same time, as will be explained in greater detail below. The two side faces 10, 11 each include an annular recess 12, 13.

In addition, a plurality of circumferentially distributed slots 14 are provided which extend parallel to the rotational axis 15. The slots 14 are open both towards the outer face 9 and towards the side faces 10, 11. In the case of the embodiments shown, a total of three circumferentially distributed slots 14 are distributed uniformly and an angle of 120° is enclosed between slots. However, it is also possible to provide a different division where the coupling is reconnected only in those cases where a complete relative rotation of 360° has taken place between the coupling hub 7 and the coupling sleeve 42.

The slots 14 accommodate driving members 16 in the form of strips. The driving members 16 are shorter than the slots 14 between the two side faces 10, 11. However, by means of their lateral ends, the driving members 16 extend into the region of the annular recesses 12, 13. In the base region, the radially inner region, the driving members 16, towards their delimiting side faces, are provided with first switching faces 17, 17'. The first switching faces 17, 17' are flat with reference to the rotational axis 15 and they enclose a large angle between them. Towards the heads of the driving members 16, there follows steeper second switching faces 18, 18'. The drive in the driving direction of rotation according to arrow N is provided by torque transmitting faces 19. The faces 19 are arranged at the head of each of the driving members 16 and end in the head face 50. In principle, the coupling also acts as an overload coupling in the direction of rotation opposed to the arrow direction N. However, the description applies to the driving direction of rotation N only. In the region of the two annular recesses 12, 13, guiding faces 24, 25 are provided which extend radially relative to the rotational axis 15. The rotational axis 15 is positioned perpendicularly on planes containing the guiding faces 24, 25.

At the side of the side face 10, a first switching ring 22 is provided. The switching ring 22 includes a bore 26. The switching ring 22 is arranged with play relative to the outer face 28 of the coupling hub 7. Thus, the first switching ring 22 is freely movable by the amount of play in the radial direction. The first switching ring 22 includes a projection which extends into the annular recess 12. The projection, via its righthand end face, rests against the first guiding face 24 in the torque transmitting position. It includes a first supporting face 20 which in the torque transmitting position, rests against the first switching faces 17 of the three driving members 16. The first supporting face 20 may have the shape of a rotating conical face for example. It is shaped to match the first switching face 17. Both may contact one another in a planar way.

Furthermore, the first switching ring 22 includes a second supporting face 21 which is intended to contact the second switching face 18' when the driving members 16 are in the disconnected position. At its end associated with the first switching ring 22, the coupling hub 7 includes an outer thread 30 onto which there is threaded a nut 31 which serves as a supporting face for a spring 32. The spring 32 includes a plurality of individual parts of a plate spring. The other end of the spring 32 is supported on the first switching ring 22 while pushing the ring in the direction of the guiding face 24, which serves as a stop. Towards the other end of the coupling hub 7 a further outer face 29 is provided at the coupling hub 7. The outer face 29, towards the driving members 16, ends at the second radially extending guiding face 25 of the annular recess 13. Radial play is provided between the outer face 29 and the bore 27 of the second switching ring 23. The radial play enables the switching ring 23 to adjust itself in the radial direction. The second switching ring 23 rests against the second guiding face 25. The switching ring 23, towards the other side, is held by a securing ring 33 to prevent any axial displacement so that it can move in the radial direction only. The second switching ring 23 includes a first supporting face 20' which, as illustrated, rests against the first switching face 17' of the driving members 16 in the torque transmitting position and assumes a conical shape. The second supporting face 21', following in the direction of the head face 50, serves to support the driving members 16 in the disconnected position by resting against their second switching faces 18'. At its annular face arranged towards the side face 10 of the coupling hub 7, the first switching ring 22 includes an annular recess 34 which has a conical face 35 tapering towards the spring 32.

A centrifugal weight 36, composed of three centrifugal sectors 36' in the shape of annular sectors, engages the annular recess 34 via a holding lug 51. The centrifugal segments 36' which form the centrifugal weight 36 include first guiding faces 39. The guiding faces 39 are positioned perpendicularly to the rotational axis 15 and serve to guide the centrifugal segments 36' in the radial direction on the side face 10 of the coupling hub 7. Furthermore, the centrifugal segments 36', at their holding lugs 51, each include a conical or partially conical face which constitutes the second guiding face 40. The second guiding face 40 corresponds to the conical face 35 of the annular recess 34. The mating faces 35, 40, in the position illustrated, hold the centrifugal segments 36' in their radially inner position with reference to the rotational axis 15. The inner end face 37 contacts the stepped seat face 38 of the switching ring 22.

The centrifugal segments 36' are held in the radially inner position by means of a hose spring 41 in the form of a ring-shaped helical tension spring. Furthermore, the centrifugal segments are held in an enclosed condition by the annular recess 34 in connection with the holding lug 51 as long as the driving members 16 are in the torque transmitting position according to FIGS. 2 to 4. The arrangement is such that the first switching ring 22 is pushed by the spring 32 towards the right in the direction of the driving members 16.

Supporting face 20 is supported on the first switching face 17 and the driving member 16, in turn, by its further first switching face 17', is supported against the supporting face 20' of the second switching ring 23. Due to the slot 14, the driving member 16 is able to more freely until it comes to rest against the fixedly supported second switching ring 23. However, the movement can continue only until the first switching ring 22 comes to rest against the first guiding face 24, which constitute a stop. In this position, the driving members 16 are held such that they engage correspondingly circumferentially distributed recesses 45.

The recesses 45 are groove-shaped and arranged in the bearing bore 43 of the coupling sleeve 42. Torque transmitting faces 19 contact the respective torque transmitting face 46 of the coupling sleeve 42. The coupling sleeve 42 is supported on the outer face 9 of the coupling hub 7 by its bore 43. Furthermore, the coupling hub 7 is prevented from axial displacement by securing rings 33, 52, a shoulder 53 and a bearing 54 and held in the coupling sleeve 42. The coupling hub 7 and coupling sleeve 42 are able to rotate relatively with reference to the rotational axis 15 and they can rotate jointly around the rotational axis 15. As long as there is no torque load, the switching rings 22, 23 are not loaded by the driving members 16. The centrifugal segments 36' are received in the bore portion 44 of the coupling sleeve 42, with their radial movement limited by the wall of the bore 44.

In the region of their holding lugs 51, towards the left, towards the spring 32, the centrifugal segments 36' include a holding face 48. The first switching ring 22 includes a corresponding annular face serving as the holding face 47. In the direction of rotation N, in front of the grooves 45, a control face 49 is arranged which is positioned outside a circle delimited by the diameter of the bearing bore 43. The control face 49 serves to guide the driving members 16 for re-connecting purposes in the direction of the grooves 45 if overloading occurs.

If overloading occurs, the driving members 16, starting from the torque transmitting position according to FIGS. 2 to 4, are displaced radially inwardly. In the process, the first switching ring 22 is moved towards the left against the force of the spring 32. At the same time, the driving members 16, also, continue to move towards the left until they assume the position shown in FIGS. 5 and 7. The second switching faces 18, 18' come into contact with the second supporting faces 21, 21' of the two switching rings 22, 23. The driving members 16 are in the disconnected position. The set torque can no longer be transmitted. The coupling hub 7 can rotate more quickly than the coupling sleeve, the direction being the driving direction of rotation N. By displacing the first switching ring 22 towards the left in the direction of the nut 31, the holding lug 51 of the centrifugal segments 36' is released. Thus, the second guiding faces 40 of the centrifugal segments 36' lose their contact with the conical face 35 of the switching ring 22.

Figure 8:
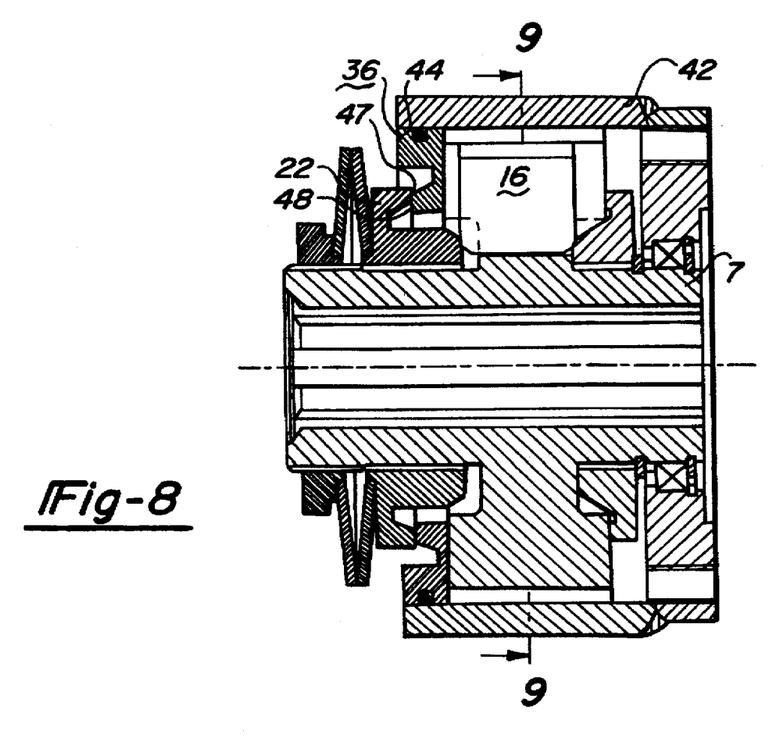
FIGS. 8–9 are section views according to FIGS. 5–6, with the coupling in the disconnected position and with the limit speed still being exceeded, a relative position of the coupling sleeve relative to the coupling hub, in which position the driving members have experienced a slight displacement towards the outside to achieve a braking effect.
Figure 9:
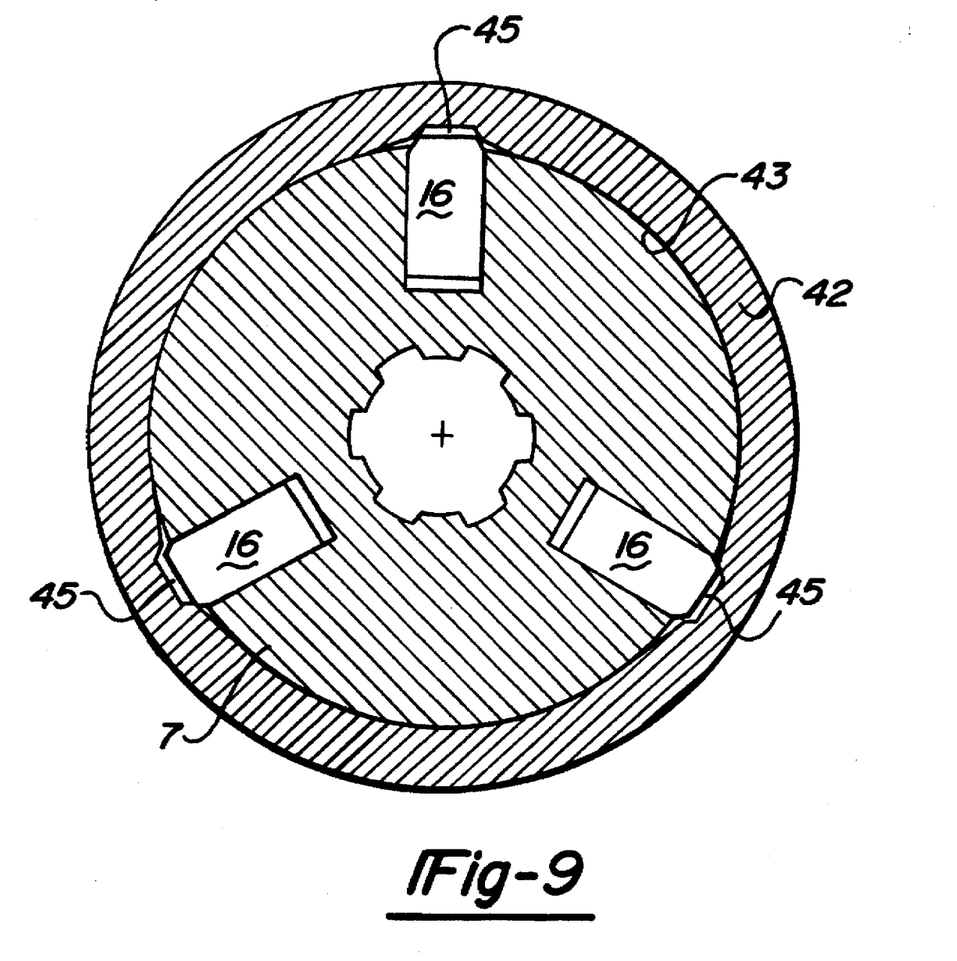

When applying a certain speed, the centrifugal segments 36' can move outwardly against the force of the hose spring 41 until their outer faces contact the wall of the bore 44. Because of the direction in which the second switching faces 18, 18' and the second supporting faces 21, 21' extend, only a low force is applied to the driving members 16' by the spring 32 and the first switching ring 22, which force tries to move the driving members 16 into the radially outer position into engagement with the grooves 45. However, the driving members are prevented from full engagement by the two holding faces 47, 48 which are normally held at a slight distance from one another, as can be seen in FIGS. 8 and 9, come to rest against one another, thus preventing further engagement. Thereafter, the driving members 16 are lifted again because they are moved radially inwardly by a small amount until their head faces 50 again contact the bearing bore 43. This process is repeated as long as the speed is exceeded, which holds the centrifugal segments 36' in their outer position in contact with the wall of the bore 44.

If the speed drops, for instance when the drive of the power take-off shaft of the tractor is disconnected, and if the limit speed at which the centrifugal segments 36' assume their radially outer position is not reached, the hose spring 41 forces the centrifugal segments 36' to assume their radially inner position. The centrifugal segments 36', via inner faces 37, rest against the seat face 38 of the first switching ring 22. When the speed is lowered in this way, it becomes possible for the driving members 16, under the force of the spring 32, to engage the recesses 45 when reaching a position which corresponds to that of the recesses 45 and when their torque transmitting faces 19 come to rest against the corresponding torque transmitting faces 46 of the recesses 45. In the process, the switching ring 22 moves into the position as illustrated in FIGS. 2 to 4. When being transferred into the torque transmitting position, the driving members 16 carry out a combined radial and axial movement relative to the rotational axis 15.

While the above detailed description describes the preferred embodiment of the present invention, the invention is susceptible to modification, variation and alteration without deviating from the scope and fair meaning of the subjoined claims.

I claim:

1. A torque limiting coupling adapted for use in a driveline for driving agricultural implements or machinery, comprising:

a coupling hub and a coupling sleeve defining a bearing bore relatively rotatably supported on said coupling hub;

driving members positioned in recesses of the coupling hub, said driving members with reference to the rotational axis being radially adjustable between a torque transmitting position and a disconnected position;

switching faces on said driving members at their two radially inner ends in the direction of the rotational axis and a torque transmitting face, on said driving members at radially outer ends, said transmitting faces acting on torque transmitting faces of recesses in the bearing bore of the coupling sleeve for the torque transmitting position;

at least two switching rings one arranged on each side of the driving members in the direction of the rotational axis, each switching ring including a supporting face for providing support on the switching faces of the driving members and one of said at least two switching rings being spring-loaded by a spring in the direction of the rotational axis for pushing the driving members into the radially outwardly displaced torque transmitting position, and said one switching ring, against the force of the spring, enabling the driving members to be moved into the radially inner disconnected position if a predetermined torque is exceeded;

at least one of the said switching rings is adapted to be coupled with at least one centrifugal weight, said centrifugal weight, with reference to the rotational axis, is radially adjustable between a radially outer disconnected position and a radially inner position, said centrifugal weight being held by the one switching ring in the inner position to prevent the centrifugal weight from being moved and being released by the switching ring and being moved into the disconnected position if the predetermined torque is exceeded, said centrifugal weight holding the one switching ring to prevent said switching ring from being returned into the torque transmitting position, as long as a predetermined switching speed is exceeded.

2. A coupling according to claim 1, wherein the recesses for receiving the driving members are provided in the form of slots in the coupling hub, which slots extend radially and parallel relative to the rotational axis and said driving members are adjustable radially and in parallel to the rotational axis.

3. A coupling according to claim 2, wherein the other switching ring of said switching rings is non-adjustably supported on the coupling hub in the direction of the rotational axis and that the one switching ring is adjustable and loaded by said spring supported on the coupling hub in the direction of the rotational axis towards the torque transmitting position.

4. A coupling according to claim 1, wherein in the torque transmitting position, the switching ring is in contact with a stop of the coupling hub.

5. A coupling according to claim 1, wherein in a radial plane relative to the rotational axis, the switching rings are guided at the coupling hub so as to be adjustable to a limited extent relative to the rotational axis.

6. A coupling according to claim 1, wherein the driving members switching faces, on both sides, include first and second switching faces and said switching rings support faces each include first and second supporting faces with said first switching faces and said first supporting faces contacting one another in the torque transmitting position of the driving members and said second switching faces and the second supporting faces contacting one another in the disconnected position.

7. A coupling according to claim 6, wherein said second switching faces and second supporting faces hold the switching ring at an axial distance from the centrifugal weight.

8. A coupling according to claim 1, wherein said switching ring with which the centrifugal weight is associated includes an annular recess which is engaged by the centrifugal weight by means of a holding lug.

9. A coupling according to claim 1, wherein said centrifugal weight is radially adjustably guided on a radially extending guiding face of the coupling hub.

10. A coupling according to claim 1, wherein said centrifugal weight is loaded by a spring force towards the radially inner position.

11. A coupling according to claim 1, wherein said centrifugal weight includes a plurality of centrifugal segments.

12. A coupling according to claim 11, wherein said centrifugal segments are loaded by a helical tension spring which embraces said centrifugal segments and forms a closed ring.

13. A coupling according to claim 1, wherein said centrifugal weight is received in a bore of the coupling sleeve, the wall of said bore delimiting the movement of said centrifugal weight in the disconnected position.

14. A coupling according to claim 1, wherein said centrifugal weight and the one switching ring include holding faces which serve for axially supporting the switching ring against the centrifugal weight.

* * * * *